May 19, 1953    C. C. DOYLE    2,639,364
HEATING CONTROL APPLIANCE
Filed July 14, 1949    5 Sheets-Sheet 1

INVENTOR.
Charles C. Doyle
BY
Atty

May 19, 1953   C. C. DOYLE   2,639,364
HEATING CONTROL APPLIANCE
Filed July 14, 1949   5 Sheets-Sheet 2

INVENTOR.
Charles C. Doyle
BY
*[signature]*
Att'y

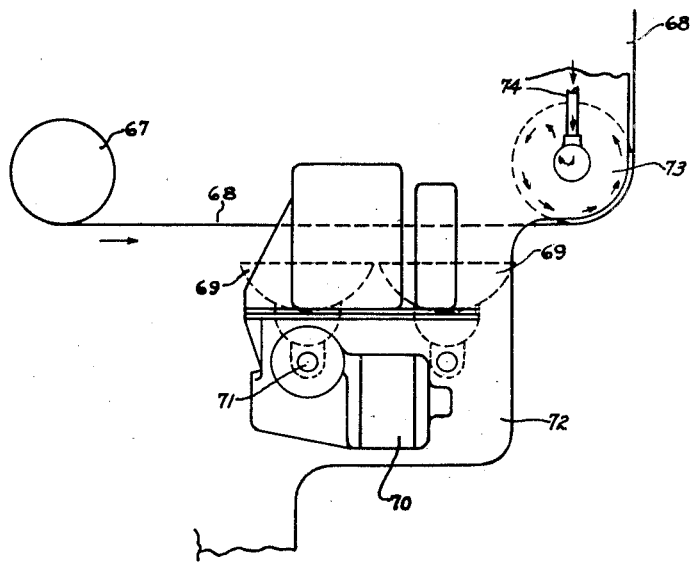
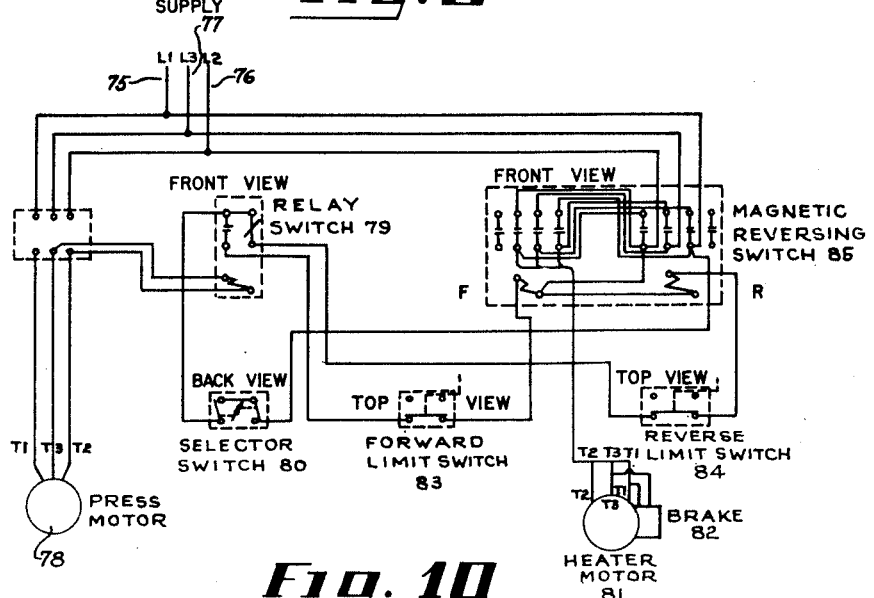

May 19, 1953

C. C. DOYLE 2,639,364

HEATING CONTROL APPLIANCE

Filed July 14, 1949

INVENTOR
CHARLES C. DOYLE

BY
ATTORNEY

UNITED STATES PATENT OFFICE 2,639,364

HEATING-CONTROL APPLIANCE

Charles C. Doyle, Willoughby, Ohio

Application July 14, 1949, Serial No. 104,720

11 Claims. (Cl. 219—19)

My invention comprehends a multi-control both of the operation and/or location of a carrier for material to be heat-conditioned and of the operation and/or location of a heater. More particularly, the assembly comprises cooperative mechanisms, (1) for varying the distance between a conveying appliance and a heating appliance and doing so automatically according to whether the rate of travel of the material through the heated zone is that which attains successful results or is sub-normal, (2) for automatically varying the measure of heat to which the material may be exposed whenever the hazard of an over-exposure occurs, (3) for automatically determining both the measure of and the time for initiated heat, (4) for automatically determining the starting and ending of the relative movement between the two appliances and (5) for artificially subjecting the material to a cooling effect on emergency.

This application is a continuation in part of my application Serial No. 584,308, filed March 23, 1945, which has now been issued as Patent No. 2,479,913 of August 23, 1949.

While the particular appliance which is mounted so as to move toward or away from the other appliance may feasibly be either the conveying appliance or the heating appliance (bodily movement of a heater-adjacent part of a conveyor being old in the art and bodily movement of the heater being disclosed in my patent just identified) and similarly the character of heat generation (whether open gas flame, oven or electrical-resistance type) is variable to suit industrial conditions, I have elected to illustrate infrared, open-glow, electrical heaters and controlled bodily movements thereof because the company with which I am associated is the pioneer, both in their use and locations. An extensive series of differing applications of my heaters or dryers or conditioners progressed from the printing industry into an ever widening range of industrial uses for the processing of many materials other than printing paper and inked impressions thereon.

The multi-controls which I originated and have successfully reduced to practice in commercial production and sales may function in different sequential order depending upon the amount of heat; the rapidity of its generation; the character of the material to be controllably subjected to heat; its rate of travel through a heat zone; whether the heat rays are penetrating like the infrared or directly raise the temperature by convection or through high frequency current induction; the sensitivity of the material or some coating thereon which is to be transformed or "set," for instance, printing inks; and the properties of an extensive list of patterned fabrics, synthetic products whether crystals of raw plastic or fabrications thereof.

Heating by convection, by conduction and by radiation has been practiced for years as has been the conversion of electrical energy into heat from either low or high frequency. However, a need has existed for regulatory controls which in most cases are desirably automatic in operation.

The objects of my invention are mostly declared in the following narration which includes one complete cycle effected with the aid of specific automatic, electrically motivated controls, which are, moreover, often beneficial when the applied heat might be detrimental to adjacent objects such as machine or conveyor parts like the composition rollers on a printing press.

This disclosure pertains to the control of artificial heat for processing or conditioning many classes of material, exemplifiedly with electrically created heat and consequently by use of contactors (any kind of special-function switches) some of which are dependently subject to the actuation of what might be termed an initiating contactor. Singly or in pairs, they function to control periodicity, relative location as between the heater and the material exposed to heat, amount of voltage, time of initiation of heat, time of its cessation, intensity and manner of heat transfer.

For instance, in printing a pattern on a roll of cloth it is important that the impression be quickly dried so that the material may be promptly rolled up again without smearing. As long as the material is moving past the heat source, it is safe to maintain a high temperature for transfer thereto. If the material should cease to move the material could be damaged by too long an exposure. Even when the heat is cut off there is sometimes enough residual heat to scorch or otherwise damage the material or some part of a conveyor therefor. In the presence of radiant heat, it is usually sufficient merely to direct the radiation away from the material. Some mechanisms for effecting the bodily displacement either of the heater or of an adjacent part of the conveyor (roller on a printing-press feed) helpfully incorporated a counterbalance. Occasionally too, an artificial cooling means for some part of the conveyor may be advantageous. Since our pioneering use decades ago of the goose-neck (universal joint) support of an electric heater, we introduced: the multi-movement floor standard (Patent No. 2,455,047 of November 30, 1948); the reciprocal movement of the heater toward and away from the material, either above or below it or in both places or at one or both sides thereof, hand or power operated; one or a pair of obliquely slidable heater supports; a heater hinged at one end to a frame; a pair of heaters so turnable, like jaws, on a rod which is turned by an automatically energized auxiliary motor; on a rotary press, where little free space is provided, a number of heaters at various locations turnable around a longitudinal axis of each heater.

While the "to and fro" shift of a heater may be mechanical, pneumatic or hydraulic or electric motor actuated, in most cases the auxiliary electric motor is preferable because so readily placed in the same circuit with, say, a solenoid control of some form of contactor like a "time" or "limit" switch. I have used solenoids in two ways, one to both hold the heater in functionating position and to move it, the other in connection with a relay to operate the auxiliary motor, a brake therefor or a cooling agency.

A solenoid might directly actuate with its own thrust arm with such a plunger extended while the solenoid is open or the reverse; or conjunctive springs might be used either to reverse the procedure or to furnish an added thrust action; or compound leverage might constitute the solenoid actuator, either to add strength or to multiply distance; or the energization might accomplish an arcuate motion for directly turning a heater about an axis—as by a helical interfitting between its actuator and a member to be turned.

Some of my heating units are equipped with a switch control for differing widths of energization according to the width of material being exposed thereto, or the wiring for delivering infrared rays may be set to radiate fractional heat. Likewise, the temperature may be raised by regulating the input of electricity by means of a transformer, rectifier or adjustment in multiple by means of heat-switches.

A relay switch of the magnetic type, when energized, serves to draw into contact a terminal to close an electrical circuit. For instance, when the main driving motor is started, a small amount of current would energize a magnetic coil which would draw two terminals into contact to complete another electric circuit of either higher or lower voltage. In short, the circuit for energizing the magnetically operated contactor device remains quite independent thereafter of the circuit of which the terminals are a part. One relay operates a magnetic switch to close the circuit of which my resistance heater is a part and automatically as soon as the conveyor-driving circuit is closed. Another relay operates another magnetic switch to make the connection to start, say, an auxiliary motor which displaces or replaces the heater. Still another relay is introduced when a control for a motor-brake is employed, but such relay is from the line which supplies current to the comparatively small, gear-reduction or auxiliary motor—in effect to relay from a circuit which is subject to the control of a different relay.

For such clarification as it may furnish, I add the steps of one particular cycle in commercial production:

(1) When the main motor starts, a small amount of current is relayed from that motor to a magnetic switch which operates a contactor to admit current to the resistance element of the heater.

(2) Another relay from the main-driving circuit causes another magnetic switch to operate another contactor to admit current to a reversible, gear-reduction motor which actuates the energized heater or gang of heaters into a position of suitable proximity to the path of material on a conveyor which was set in operation by the main motor.

(3) When a heater reaches its desired position, it may be stopped in its movement by a pin on a driving chain which serves to throw a limit switch to shut off current to the auxiliary motor.

(4) Thereupon a solenoid is demagnetized causing a brake, with which it is functionally associated, to snap shut and stop the auxiliary motor to maintain the heater in the position desired, as long as the entire assembly is in operation by the main motor.

(5) If, for any reason, the conveyor should stop moving, the procedure is reversed, initially by release of the brake.

(6) The heater becomes deenergized.

(7) The auxiliary motor commences to reverse itself to displace the heater or gang of heaters or group of appositioned heaters between which the material may have traveled.

(8) At the proper time, a pin in the chain re-operates a limit-switch to stop the auxiliary motor after it has adequately displaced the heat source.

On occasion another relay effects a contact and maintains it as long as a spring-tension of a "time" switch exists. This is being used where proof presses are used frequently, but only for short periods of time.

As further indicative of objects of my invention to which commercial introductions by me and others have given rise:

Although the web of a printing press had for decades sagged (separated from any applied heat) whenever the press stopped, such sagging being consequent to continued roll movement, it later became desirable to accomplish such relative movement, as between a heater and material to be heat-processed, under control both as to time and distance. (See, for instance, domestic patents to White No. 1,266,735 of 1918; to Barker No. 1,924,100 of 1933 and Presby No. 2,229,017 of 1941.)

A high frequency, alternating current, with an oscillator (not to be shown because old) as its source, is entirely feasible, subject to my controls—whether such an electrical field communicates heat by direct contact (when the dampened material itself may be a conductor until dry) or whether by the induction method. (See patents in class 219, sub-class 47.) A "standard" wave length may be adopted and be variable with the voltage.

I also contemplate occasional employment of a transformation of a low voltage into a high amperage, suitable resistance elements being caused successively to receive current subject to one of my control combinations.

Selectors as control adjuncts for permitting energization of auxiliary circuits may be either manual, clock-mechanism governed to establish a predetermined time interval or may be automatically operative whether thermostatically or magnetically controlled, will be regularly incorporated to satisfy specific requirements.

A cooling agency, illustrated to supply, say, refrigerated air to a roller or other surface in proximity to which the earlier heated material is to pass, will at times be desirable (for instance, when printing gummed tape so as not to wind a heated roll) along with conduits, sometimes, for recovering the cooling medium preparatory to redistribution.

So too, while the pre-heating of the paper on a printing press (i. e. before printing thereon) has earlier been adopted, being highly desirable as an avoidance of a delay even for a few minutes when a special newspaper edition is to be run, my controls accomplish preheating automatically by effecting a pre-energization of the heater and to any chosen degree of temperature along any required spatial area. Gangs of heaters arranged in a row, longitudinally along the path of travel of the material may be variously controlled—either by terminating heat-delivery by any preferred group of the heaters, by varying the amount of heat from some or all through an automatically operated rheostat subject to the stoppage of sub-normal rate of travel of the material.

Advertising to the drawing:

Figure 9 shows in conjunction with means for swinging heating units away from an appositioned position to the path of a web of material— a cooling agency for the material subsequent to its heat-conditioning, exemplified as a water-cooling roll.

Figure 10 is a more elaborate wiring diagram for performing the eight steps of the particular cycle earlier described in this specification.

It is to be understood that some form of relay or automatic contactor-control will be employed except in the simpler installations, consequently, that, for instance, in combination with the showings of Figures 4, 5, 6 and 9 some appropriately selected control appliance is to be considered as contemplated to be cooperatively included in said four figures of the drawings even though not superfluously reillustrated therein because no claim of novelty is made for units of the electrical hook-ups by themselves, instead only for some automatic control (spacing between heater and material, timing of initiation of material travel or of heater energization or thermal) of the distinct assemblies.

Figure 1:
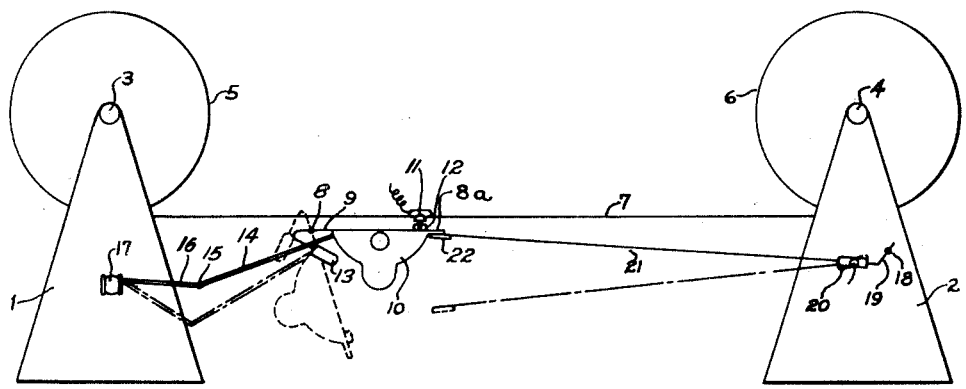
Figure 1 is a diagrammatic elevation of a conveyor comprising winding and unwinding rolls and embodying my inventions with certain parts shown by dot and dash lines in alternative positions. (This figure is a duplicate of Fig. 1 of the parent case.)

The illustration of the winding and unwinding rolls in Figure 1 were selected to simplify. Essential here is that some form of heater be appositional, below, above from either side or both above and below or from both sides of traveling material which the first figure merely exemplifies as being the web of a printing press. The desirable use of some species of control comprehended by my inventions, having priority to early 1944, whereby—(a) a deenergization of the heater occurs when the travel of material past it ceases or is at a sub-normal rate of speed, (b) separation of the path of material and source of heat as an added safeguard when an excess of residual heat obtains, (c) delayed action of heat delivery, (d) preheating as is occasionally required, (e) high-frequency current as the source of heat to be transferred, (f) voltage-to-amperage control, (g) subsequent cooling (refrigerated air in lieu of water), (h) control of the start of material and heater separation or of restoration of their effective proximity or control of the cessation of either, (i) having one automatic control subject in its operation to another "contactor" control as conditions may determine to be expedient.

Spaced pedestals 1 and 2 respectively constitute a support for carrying shafts 3 and 4 on which indeterminately long lengths of, say, printing paper, wall paper or textile material are to be rolled and unrolled with an intermediary web to be exposed to artificial heat. The rolled paper on the shaft 3 has been designated by the numeral 5, that on the shaft 4 with the numeral 6 and the web with the numeral 7. Pivotally mounted on a fixture or part of the press at 8 and intermediately of its ends is a bracket 9 to which is attached the open side of an electrical (radiant) heater 10. Another fixture carries a conventional socket terminal 11 for the reception, in one position of the heater, (here exemplified as the displaceable unit for varying the distance between it and the material being processed) of a dual-prong plug 12 which is attached to the upper side of the free end of the bracket 9 and from which it is insulated. A counterweight 13 has a bowed connection with the bracket 9 on the opposite side of the pivot 8 to serve the ordinary purpose of insuring a smoother, downwardly-swinging displacement of the heater, yet subject to the dampening function of a device comprising a rod 14 having one end turnably connected with the heater casing, its other end articulated at 15 with one end of another rod 16 while its other end is operatively connected with a frictional check or movement-restraining contrivance 17. The other pedestal 2 has a pivot 18 for a lever 19 to be considered as the manual control for press operation. Whatever the mechanical connection with the upper end of the lever 19, its other or lower end is adapted to rock, about a pivot point 20, an elongated extension 21 terminating as a flat finger 22 which may be caused to underlie a suitable projection 8a on the bracket 9. When in that position it serves to maintain the plug 12 within the socket 11 against the tendency of the counterweight 13 to effect a withdrawal of the former from the latter. An actuation of the press-control-lever to stop the press, will swing the extension 21 downwardly to its dot-and-dash-line position, shown, whereby presently to permit the projection 2a to swing clear of the extremity of the finger 22 in response to the action of the counterweight 13 until the heater and counterweight ultimately assume their dot-and-dash-line positions. Now evident should be that any stoppage of the press will break the electrical connection at 11—12 for supplying current to the heater 10 and also cause the bodily swing of the heater so that its residual heat is removed to a zone more remote from the path of travel of the material. In this form of my invention the heater is to be manually restored to its functioning position and there maintained upon operation of the press because the press-driving motor, electro-magnetic means and heater are in the same circuit.

Figure 2:
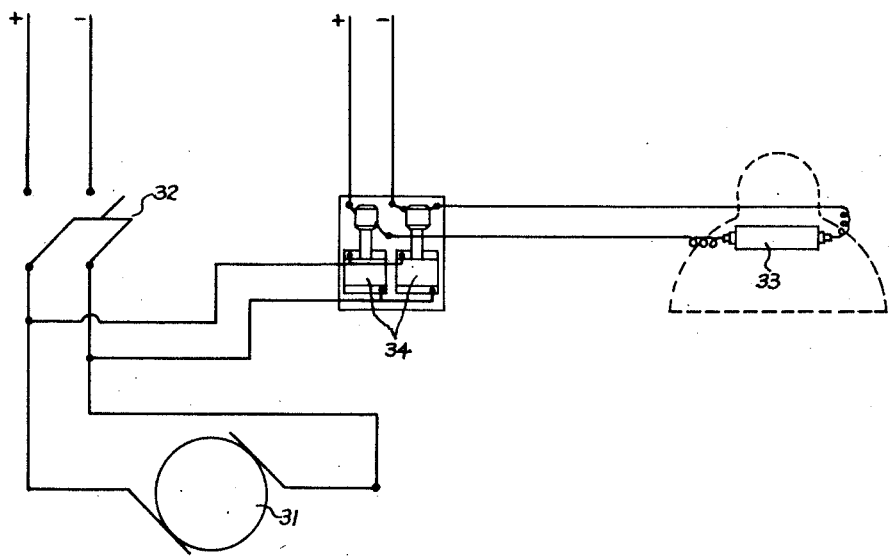
Figure 2 is a wiring diagram including one marketed type of delayed-action switch whereby the heater becomes energized an interval of time after the machine on which it is mounted has commenced operation. (This being a duplicate of parent Fig. 3.)

The wiring diagram of Figure 2 comprises an electric motor 31, a switch 32 for simultaneously closing both the press operation or conveyor and heater 33 circuit. However, included is a time relay 34 which has a delayed action in its control of the closing of the auxiliary circuit. Such relays are adjustable as to time-range. A fraction of a minute has served my purpose of delaying heater-energization until the material approaches a normal rate of speed and of also making the "drag" of heater energization successive to press operation.

Since all of the illustrated applications of my inventions are to comprise at least one control-contactor or an equivalent relay or predeterminedly operable switch, in combination with a primary electric circuit and with one or more auxiliary circuits and with an electric motor (or electrically-controlled driving means) and with a heater (not necessarily electrically generated), it has been judged unnecessary to illustrate every unit (old by itself) in every combination which has been selected for exemplifying portrayal in the drawings. In some figures (4, 5, 6 and 7) the material-conveyor has been omitted, in Figures 3, 8 and 10 the stock to be heat-processed and mechanism for moving it in proximity to the heaters shown in Figures 3 and 8, while in Figure 10 even omitted is the heater to be reciprocably swung by the auxiliary motor with its magnetic brake.

Figure 3:
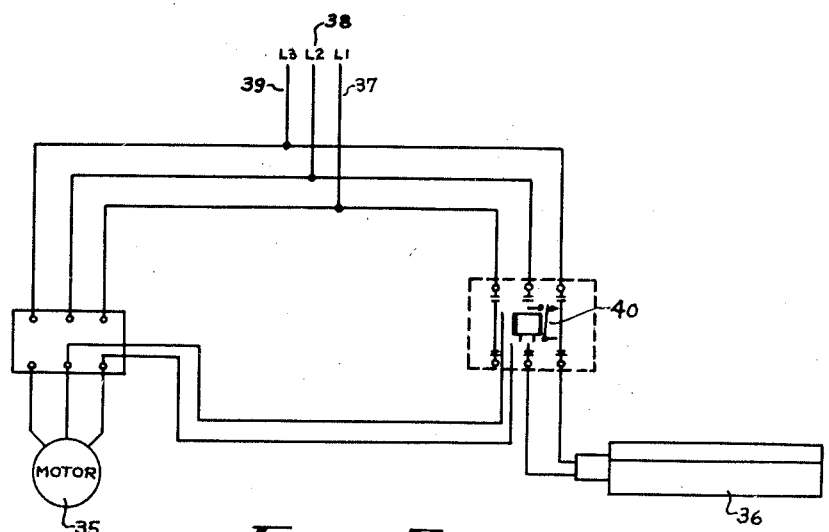
Fig. 3 is a wiring diagram of Figure 2 comprising an automatic relay contactor.

The diagram of Figure 3 includes a machine and/or conveyor-operating motor 35 and a heater 36. Three lines 37, 38 and 39 afford effective electrical connection between the motor 35 and the heater 36 in combination with an automatic relay 40 (which may be any one of several market-approved type), whereby there is a dependence of energization of the auxiliary heater 36 circuit by pre-set delay even after the closing of the primary circuit for starting the motor and a conveyor (not shown) for any material to be "heat" or "dry" processed.

Figure 4:
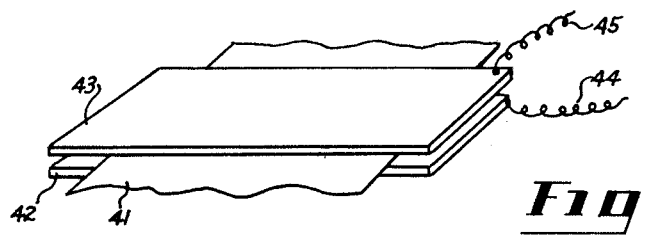
Figure 4 is a high-frequency, alternating-current electric-heater modification comprising the dielectric principle using two plates between which the material travels.

Figure 4 is one high-frequency current application showing a sheet of material 41 traveling between a pair of dielectric plates 42 and 43 having leads 44 and 45 respectively.

Figure 5:
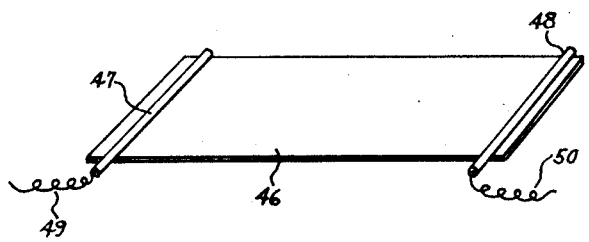
Figure 5 is another "high-frequency" modification showing the contactual, resistance principle of heat-exchange by direct contact with the material.

Figure 5 is another form of high-frequency adaptation wherein the material 46 to be conditioned is subjected to high-frequency-generated heat by rods 47 and 48 having leads 49 and 50 respectively. This type of application supplies contactual resistance heating of the material 46, a principle old by itself, yet considered to be patentably new subject to any one of my contactor controls elsewhere herein shown and described.

Figure 6:
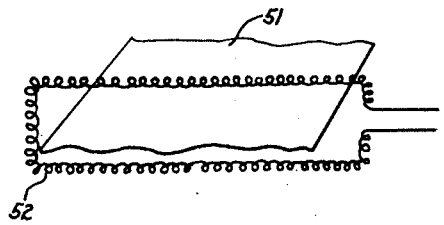
Figure 6 is a further "high-frequency" heating-appliance modification, illustrating the induction principle.

Figure 6 illustrates adequately, I believe, the induction principle of high-frequency heating—the material 51 passing, as exemplified, through a coiled loop 52.

It is to be observed in each of Figures 4, 5 and 6 that a passageway is provided through which the material to be heat conditioned will travel, likewise during the coacting control of the heater by at least one relay.

Figure 7:
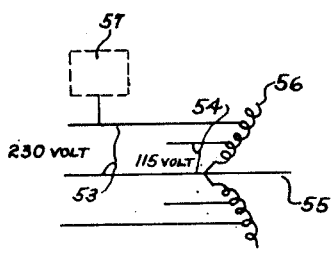
Figure 7 is a wiring diagram comprising a time-switch and transformer for selective attainment of high-amperage from low voltage.

Figure 7 is a supposedly-requisite partial wiring diagram, in view of earlier explanations, lacking the traveling material and the controlled heater unit. A tube control circuit, three-phase motor and a voltage regulator including a variable transformer are comprehended. Any standard, marketed automatic voltage regulator may be used. A 230 volt line 53, a 115 volt line 54 supply a constant output at 55 through the agency of the coil 56. Any commercially approved time-switch 57 is advantageously incorporated.

Figure 8:
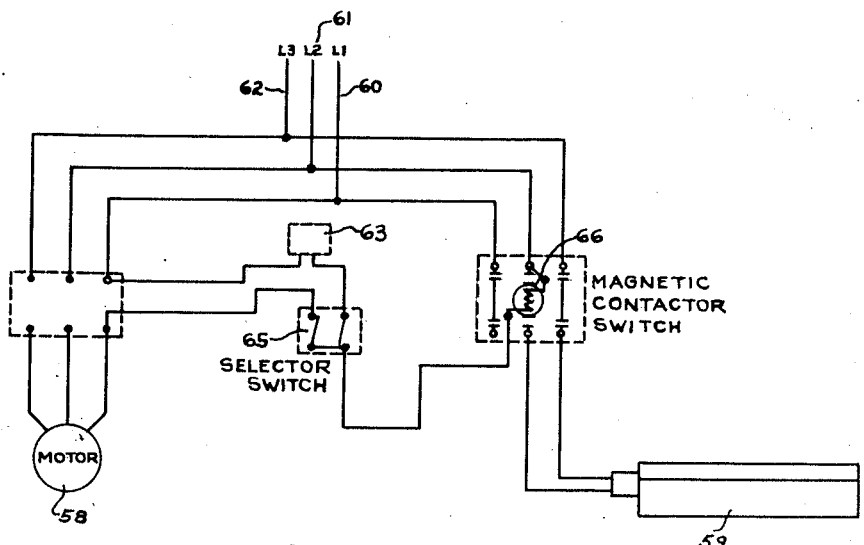
Figure 8 is a wiring diagram comprising a selector-contactor which besides being automatic might be manual, clock-mechanism actuated, or thermally controlled in actuation, whereby, for instance a pre-heating might be effected.

Figure 8 illustrates a wiring diagram for a main motor 58, heater 59, source-lines 60, 61 and 62, automatically operative contactor 63, which latter may be clock-timed, or a time-relay or a thermal switch; a manually operable selector switch 65 and a magnetic switch 66. The foregoing has been demonstrated to be not only a feasible, but advantageous hook-up for accomplishing a pre-heating.

The contactor 63 may be set to energize the heater 59 a predetermined time before the motor 58 is energized, but will, after an interval, de-energize the heater 59. Alternatively, the timer 63 may regulate the temperature of the heater 59 on a percentage basis, for instance, at ninety per cent the energization is in cycles of "on" ninety percent of the time and "off" ten percent of the time. The hook-up would be in the nature of a reversal as to sequence of operation as compared with the function ascribed to the relay in Figure 2. The selector switch 65 may be a three-position switch for effecting an automatic energization of the heater 59 by closure at 65 to effect closure of 66 when the motor 58 is operating or alternatively the selector 65 may be manually operated to energize the heater after the magnetic switch 66 is closed when the motor 58 is not being driven, or to disengage the coil of the automatic relay completely so that the heater will not become energized regardless of whether the motor 58 is or is not operating. The relay symbol shown in dash-lines is to represent any one of the following:

(1) A thermal switch for controlling the initiation of energization of the heater when the material attains its proper temperature.

(2) A clock timer or time-relay so that the energization of the heater may be controlled (established) for a predetermined time or to become energized subsequently if desired.

(3) The variable contactor 63 might, indeed, be incorporated on either or both sides of the two lines coming from the motor switch—depending upon the "heating" time-differential pre-setting which conditions may make desirable.

In Figure 9 is the introduction of a thermal control, as exemplified, a cooling agency operable upon the traveling material subsequent to its heating or drying. An unwinding roll 67, say, for a web of printing paper 68, travels in suitable proximity across a pair of my infrared heaters 69 when the latter are in their functioning position, as shown. However, the heaters 69 are bodily displaceable (downwardly in this instance) by an auxiliary electric motor 70 operating through a train of gears (not shown, because not claimed specifically) to swing the heaters about a pivot point 71 on a frame 72. After conditioning, the material 68 travels in contact with a water-cooling roller 73 which is held at an adequately lower temperature by a refrigerant, instanced as chilled water circulated through the roller 73 by means of a conduit system including a pipe 74.

In Figure 10 there is disclosed a wiring diagram for a multiple contactor-control system of a primary electric circuit together with a plurality of auxiliary electric circuits. Essential to designate are a main motor 78 which when started admits current by relay to a magnetic switch 79 which operates a contactor permitting current flow to the heater motor 81. Another relay 80 causes another magnetic switch to operate another contactor to admit current to a reversible, gear-reduction motor 81 equipped with a magnetic brake 82, both of which may be of standard commercial design. The auxiliary motor 81 will shift the position of a heater or heaters (not shown) in a manner similar to the showing of Figure 9. When the heater reaches either limit of its swinging movement it is automatically stopped, say by a forward-limit switch 83 and again by a reverse-limit switch 84. A solenoid-operated and automatically-operated brake 82 associated with the motor 81 serves to stop the actuation of the latter more promptly in timed relation. Magnetic reversing switches 85 function—all in a manner old and well known in the specialized art. Manifestly, should the main-motor driven conveyor chance to stop while the heater or gang of heaters are in proximity to the path of travel of material carried by the conveyor, with hazard of injury to the material from over-heating, the cycle becomes reversed, initially by release of the brake 82, and by deenergization of the heater or group of appositioned heaters as shown in Figure 1.

The main contactor 79 (with relay switch) shown as a front view in Figure 10, and has been of a type having two circuit controls which are alternately open and closed according to whether the exemplifying press is stationary or in operation. When it conveys electric current or is "on" it serves to effect contact on the forward side of the magnetic controller 85 which exercises the function of reversely actuating the heating assembly into serviceable position. The front view of the magnetic reversing switch 85, for instance, a type having only one half magnetized, may make a connection to drive the reversible motor 81 and move the heater forwardly into suitable proximity to the path of travel of the sheet material. When the sheet-conveyor stops, the switch 79 becomes deenergized yet relays magnetic power to the other half of the reversing switch 85. However, because the small heater-actuating motor 81 would be turning "forward" as long as the material-conveying mechanism is running or would be turning "backward" continuously after the conveyor stopped, it is desirable to employ limit switches 83 and 84, both of the long publicly used lever type and having top views illustrated. They break the connection after the motor 81 has adequately advanced or retracted the heater, subject to the motor 78 and relay 79 i. e. energization or deenergization therethrough. After the heater has traveled forward into properly effective position, a trigger presses down a switch lever to break connection and to stop forward movement throughout the duration of conveyor movement. The reverse occurs after the heater has become adequately displaced. Thus the forward limit switch 83 and the reverse limit switch 84 control their respective contacts in the magnetic reversing or motor 81 controller switch 85, alternately to "open" and to "close" according to whether power at the relay switch 79 is "on" or "off". The switch 85, when closed, reverses the motor 81. When the relay 79 relays "forward" it magnetizes one-half of the switch 85 to drive the motor 81 so as to advance the heater toward the path of the material. Finally, the motor brake 82 has been one of the extensively used, or standard types here employed to hold the heater assembly in either extreme position, and operable by a magnet energized while the heater-motor 81 is running to release the braking action against spring pressure or vice versa.

The essentials of this invention are a heater adjacent to the path of movement of material to become exposed to its heat, however generated, and a series of electrical controls comprising the use, in auxiliary circuits, of varying types of contactors ( i. e. switches, relays or other electrical circuit "make and break" units) so coordinated in exercise of function as to achieve cooperation in attainment of results which are best suited to the material, with or without coating thereon, which is to be conditioned by the controlled application of heat. One of the contactors is arranged so as to be adapted to control the initiation of operation of some kind of auxiliary motivator for periodically regulating the distance between the path of the material and the source of heat while that particular contactor is subject in its actions to one or more other contactors.

Figure 11:
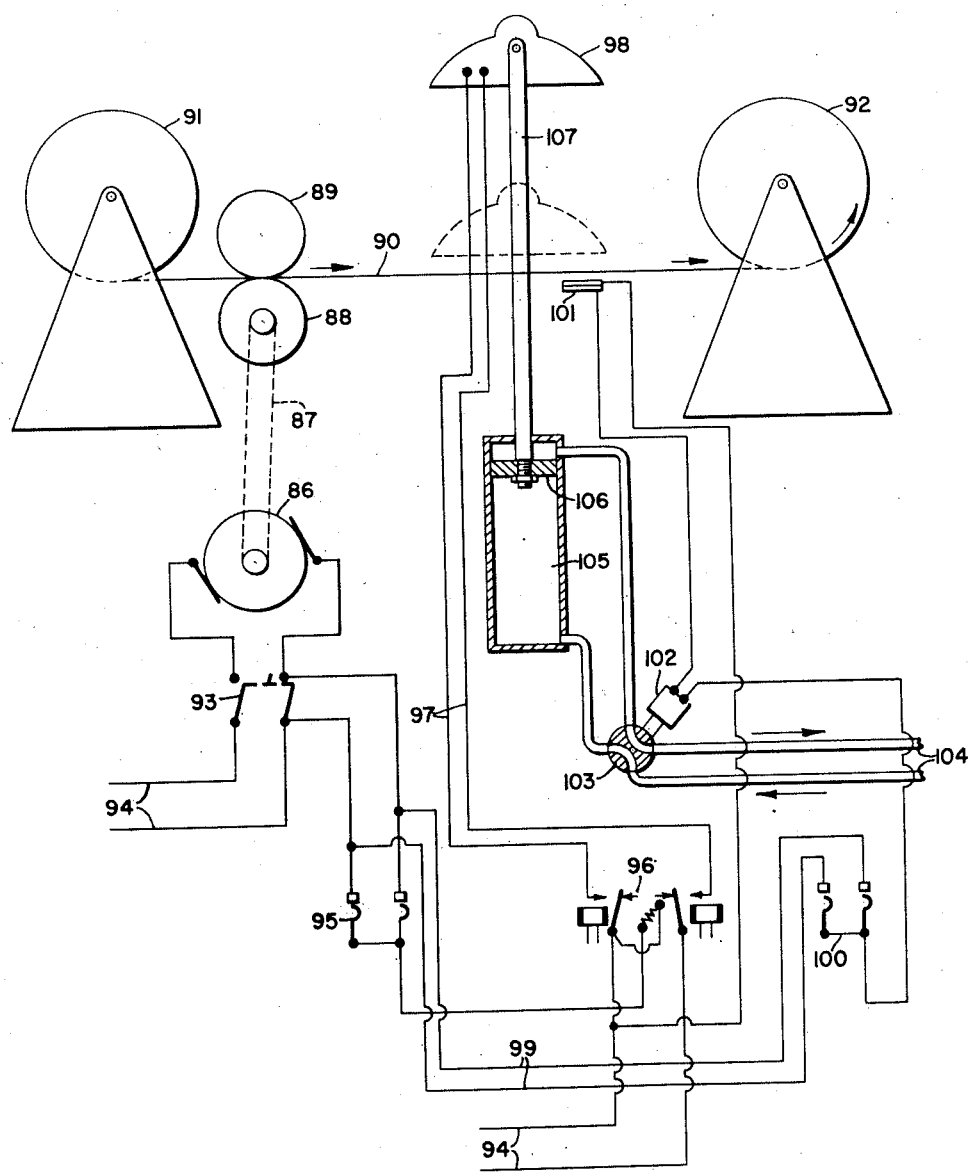
Figure 11 is a modified diagram comprising a fluid-pressure actuating mechanism.

In Figure 11, a primary motor 86 effects the travel of the material by driving such mechanism as best serves. Many kinds of conveying mechanisms have long been used in many industrial fields, wherefore here chosen has been only enough for driving the pair of standard rolls for directly causing travel of a web which exemplified in the parent application of 1945. The electric motor 86 has a driving connection 87 with an impression cylinder 88 between which and a printing cylinder 89 the web 90 is frictionally advanced from a feed roll 91 to a rewind roll 92, as indicated by the arrows. A switch 93, connected with the power lines 94, functions to energize or deenergize the motor 86. The switch 93 may be either manually or automatically operable. Current is led to a relay 95 which controls a selector switch 96, shown to be also connected with the power lines 94, and adapted to supply current to, or cut it off from, the leads 97 of an auxiliary circuit and thence to the resistance unit or units of an electric heater 98. Leads 99, energized from the switch 93 when closed, connect with a second relay 100 adapted to form part of another auxiliary circuit intended, as exemplified, to motivate the heater 98 bodily, but subject to the control here of a bimetallic thermostat 101 which is located in proximity to the path of travel of the material 90. The relay 100 and thermostat 101 coact to control the operation of a solenoid 102 and it in turn controls the operation of a four-way, fluid-pressure valve 103 which is connected in a feasible manner with inlet and outlet tubes both of which are numbered 104 because direction arrows identify them. The tubes lead to which from opposite ends of a cylinder 105 within which there is a piston 106 which has connection, by means of a rod 107 with the heater 98. Further details are unneeded because such a structure is old, used in many arts and is not specifically claimed. The modified showing is intended to portray an equivalent, fluid-pressure motivator in substitution for the auxiliary motor 70 or 81 of other figures. As will be readily understood, in operation the ascent and descent of the heater 98 will be according as the thermostat 101 attains a hazard-temperature, which means above the desired maximum, or not, respectively while subject to the control of the solenoid 102 and valve 103.

I claim:

1. An electric heating-control appliance comprising the combination of a frame, an electrically driven conveyor mounted for movement on said frame, an electric heater movably mounted on said frame for adjustable location relative to said conveyor, a brake-equipped electric motor arranged to actuate said heater mounting and a pair of automatically operative contactor means in an auxiliary electrical circuit together with said motor for alternately energizing it and its brake whereby automatically to shift the location of said heater.

2. In an electric control appliance, the combination of a frame, an electric motor, a conveyor for sheet material to be heat conditioned and movably mounted on said frame, a switch to control conveyor operation, an electric heater movably connected with said frame and adapted for bodily displacement as a unit and appositionable to said conveyor, a time switch, contacts operated by said time switch and included in an electrical circuit which includes said heater for controlling energization of said motor and for establishing a presetting for a predetermined period of time of pre-heating by said heater until said motor is energized by time-switch closure of the entire circuit and a contactor device in a circuit with said heater and responsive to the displacement movement of said heater.

3. The combination for use with a carrier for material, of electrically operable mechanism including an electric motor arranged to actuate such a carrier, an electric heater supported in apposition to the path of movement of the material and connected in a circuit to become energized together with said motor, a motivator for causing relative movement to be imparted between the material carrier and heater and an electrical control appliance arranged in a make and break circuit with said motor and motivator and including: a contactor for governing the operation of said motivator, an electrical instrument for predeterminedly establishing a time-differential of material-carrier operation and of heater energization and a second contactor subject in its operation to the functioning of said instrument for effecting in predetermined order of time the operation of said mechanism and of said motivator.

4. The combination as in claim 3 wherein thin, coated material is exposed to an infrared-ray heater achieving penetration both of the material and of the coating thereon, the relay is a thermostatic switch subject to the temperature of the heater and the time-differential is of heater energization whereby to permit selectable preheating prior to the operation of the motor for said carrier.

5. An electric heating-control appliance comprising the combination of a frame, an electrically driven conveyor mounted for movement on said frame, an electric heater movably connected adjacent to said conveyor for adjustable positioning relative to the latter, said conveyor and heater being connectable in a primary electrical circuit, a motivator arranged to actuate said heater and a pair of automatically operable contactors in an auxiliary electrical circuit, one of said contactors having a predeterminably-responsive control of the energization and deenergization of said auxiliary circuit and the other one of said contactors being subject in operation to said first mentioned contactor and arranged to control the operation of said motivator automatically to shift the position of said heater in response to operation of said electrically driven conveyor.

6. In an electrical heating-control appliance, the combination of a frame, electrically operable mechanism for feeding material to be conditioned across said frame, an electric heater carried by said frame adjacent to the path to be traveled by the material, reversible mechanism for effecting relative movement between said material-feeding mechanism and heater by bodily displacement of one toward and away from the other, electrical connections for causing one of said mechanisms and said heater to become energized and deenergized, said connections including relay controls each including contacts operated thereby respectively and arranged for hook-up in an electrical circuit which includes said heater, one of said relay-controls being arranged and adapted to govern the operation of one of said mechanisms, one of said relay-controls being subject in its operation to the other whereby the relative-movement-effecting mechanism is permitted to operate in a predetermined time relationship according to the setting established for the other, initiating relay-control and an auxiliary circuit including connections with said subject-relay control and arranged, when energized, to effect the reversal of said last mentioned mechanism.

7. In combination, a frame, an electric motor, a conveyor and an electric heater, said conveyor being mechanically and said heater being electrically connected with said motor for operation and energization respectively of the conveyor and heater, an adjustable mounting between said frame and heater, an auxiliary motivator for actuating said heater mounting, a pair of electrical control devices including one provided with contacts arranged for time-interval make and break operation and the other subject in its operation thereto and arranged for energization or deenergization whereby to govern the starting and stopping of said auxiliary motivator, connections forming a pair of electrical circuits of which said control devices are parts respectively and said connections including a contactor for controlling the flow of current through said last mentioned pair of circuits respectively and in relatively timed relation.

8. In an electrically operable assembly of the kind described, the combination of a frame, an appliance including an electric motor for conveying material to be heat-conditioned and mounted on said frame, an electric heating appliance, one of said appliances being adjustably mounted on said frame, electrical connections including a relay between said appliances whereby movement of the conveying appliance, consequent to its motor being in a common circuit, energizes said heating appliance, a switch for opening and closing said circuit, another electrical circuit arranged to receive voltage from said first mentioned circuit, other electrical connections comprising an independently powered motivator for effecting relative movement between said appliances and also comprising a switch for opening and closing said last mentioned circuit and further comprising automatically operative, electromagnetic means responsive in operation to the first mentioned switch for actuating said last mentioned switch to control operation of said motivator whereby to vary the distance between the path of travel of the material on said conveying appliance and the heated zone of said heating appliance as occasion may require.

9. In an electric-control appliance, the combination of a frame, a conveyor mounted for movement thereon, a motor in a primary circuit for actuating said conveyor, an electric heater in an auxiliary circuit and supported on said frame for apposition to the path of movement of said conveyor, a motivator for effecting relative movement between said conveyor and heater bodily, an electrical connection including a switch for starting and stopping said motor and controlling the primary circuit, a relay arranged to operate in response to the condition of said conveyor for controlling said auxiliary circuit, a contactor controlling such auxiliary circuit, said contactor being subject to the energization of the primary circuit through said relay, a second relay selectively arranged to be alternatively responsive to electrical impulse according to existence of a closed circuit of said switch and contactor, a second contactor subject in operation to said last mentioned relay, a second auxiliary circuit energized or deenergized by said last mentioned contactor, said second auxiliary circuit including an electrical control device and said motivator being governed thereby, whereby the power of said motivator is initiated to effect the relative movement between the conveyor and the heater.

10. The combination as in claim 9, wherein there are heater sections in switch-separable circuits and also additional relays connected with the conveyor motor, said additional relays being arranged to break the circuits to fractional parts of the heater in accordance with the speed-setting of the conveyor motor, whereby at one specific rate of conveyor speed a suitable fraction of the heater divisions become energized.

11. In combination, a support, mechanism for effecting the travel of material to be heat-conditioned and operatively mounted on said support, an electric motor arranged to drive said mechanism, an electric heater supported in apposition to the path of travel of material and arranged for connection in a primary circuit along with said motor, an auxiliary circuit including a contactor for controlling the effective application of heat from said heater, the alternative operations of said contactor being subject to variant conditions of being of said mechanism, a second auxiliary circuit including a motivating appliance and a switch-control, the latter responsive to the positions assumable by said contactor, the alternative positions of said switch being determinative the quiescence and operation respectively of said motivating appliance whereby automatically to establish an interdependent double control by flow of current through said auxiliary circuits in selectably timed relation.

CHARLES C. DOYLE.

References Cited in the file of this patent

UNITED STATES PATENTS

| Number | Name | Date |
|---|---|---|
| 1,266,735 | White | May 21, 1918 |
| 1,308,380 | Tweedy | July 1, 1919 |
| 1,366,069 | Doyle | Jan. 18, 1921 |
| 1,450,022 | Doyle | Mar. 27, 1923 |
| 1,468,289 | Eschenbach | Sept. 18, 1923 |
| 1,479,819 | Kluever | Jan. 8, 1924 |
| 1,555,860 | Ledwinka | Oct. 6, 1925 |
| 1,646,498 | Seede | Oct. 25, 1927 |
| 1,880,114 | Smith | Sept. 27, 1932 |
| 1,924,100 | Barker | Aug. 29, 1933 |
| 1,955,055 | Date | Apr. 17, 1934 |
| 1,969,666 | Avery | Aug. 7, 1934 |
| 2,079,708 | Hart, Jr. | May 11, 1937 |
| 2,113,770 | Richardson | Apr. 12, 1938 |
| 2,127,956 | Helmer | Aug. 23, 1938 |
| 2,177,299 | Fredrickson | Oct. 24, 1939 |
| 2,204,801 | Gessler | June 18, 1940 |
| 2,227,174 | Baster | Dec. 31, 1940 |
| 2,229,017 | Presley | June 14, 1941 |
| 2,268,986 | Hess | Jan. 6, 1942 |
| 2,325,950 | Greene et al. | Aug. 3, 1943 |
| 2,381,274 | Frostick et al. | Aug. 7, 1945 |
| 2,420,399 | New | May 13, 1947 |
| 2,448,009 | Baker | Aug. 31, 1948 |
| 2,448,011 | Baker et al. | Aug. 31, 1948 |
| 2,455,047 | Doyle | Nov. 30, 1948 |
| 2,479,913 | Doyle | Aug. 23, 1949 |
| 2,541,416 | Harrison | Feb. 13, 1951 |

FOREIGN PATENTS

| Number | Country | Date |
|---|---|---|
| 340,057 | Great Britain | Dec. 24, 1930 |